March 1, 1960

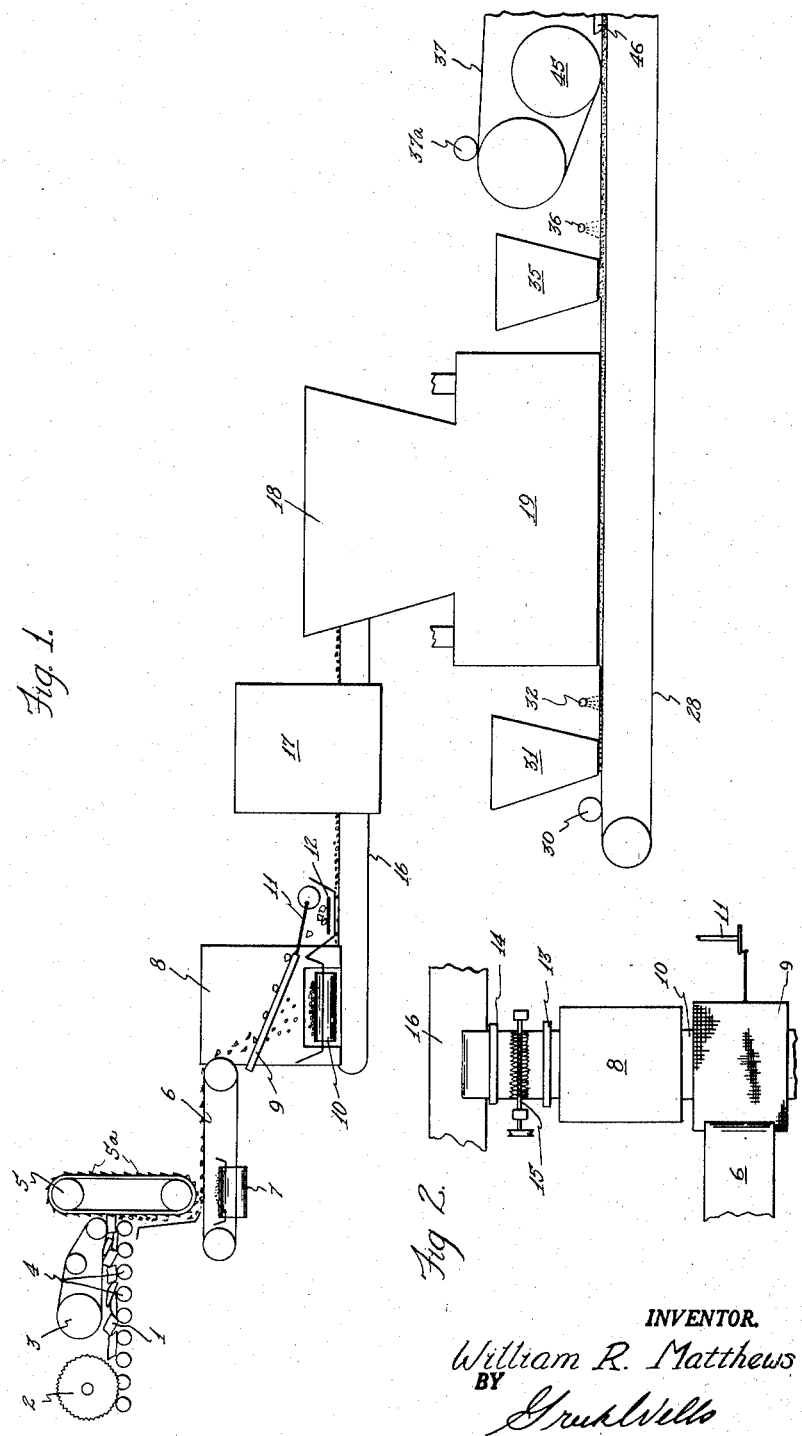

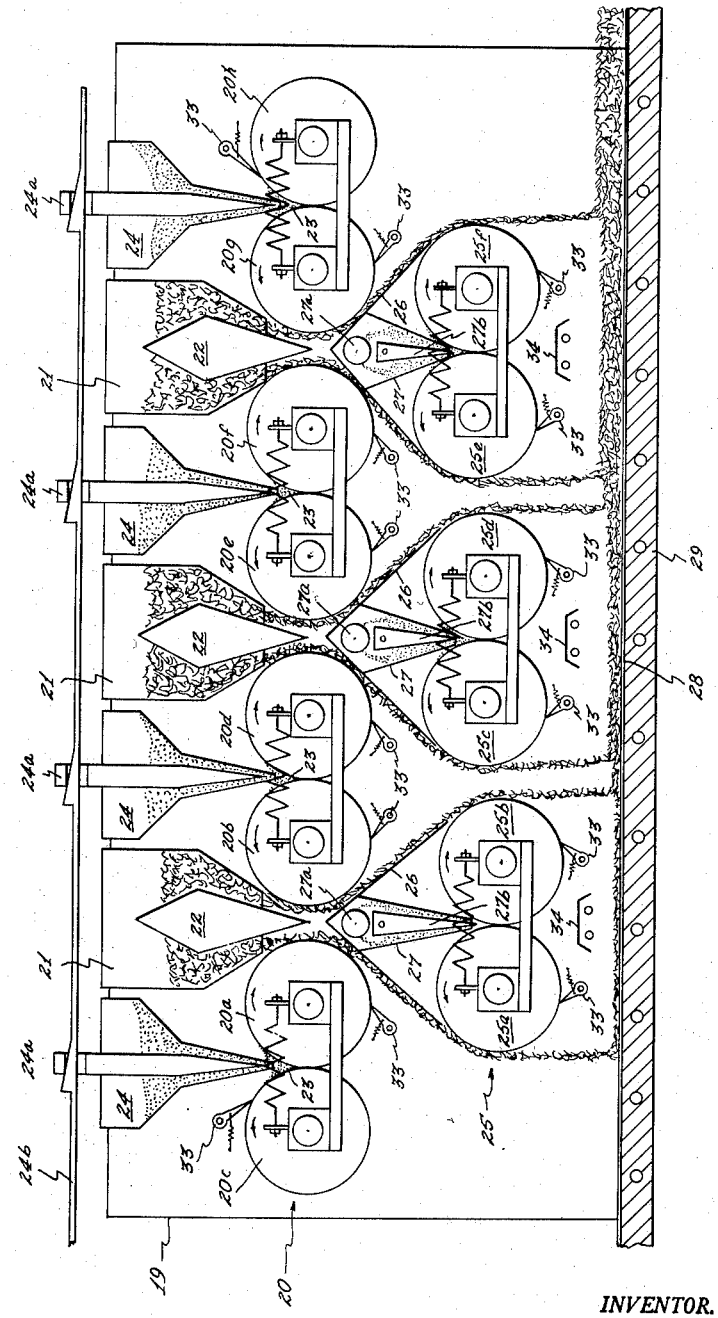

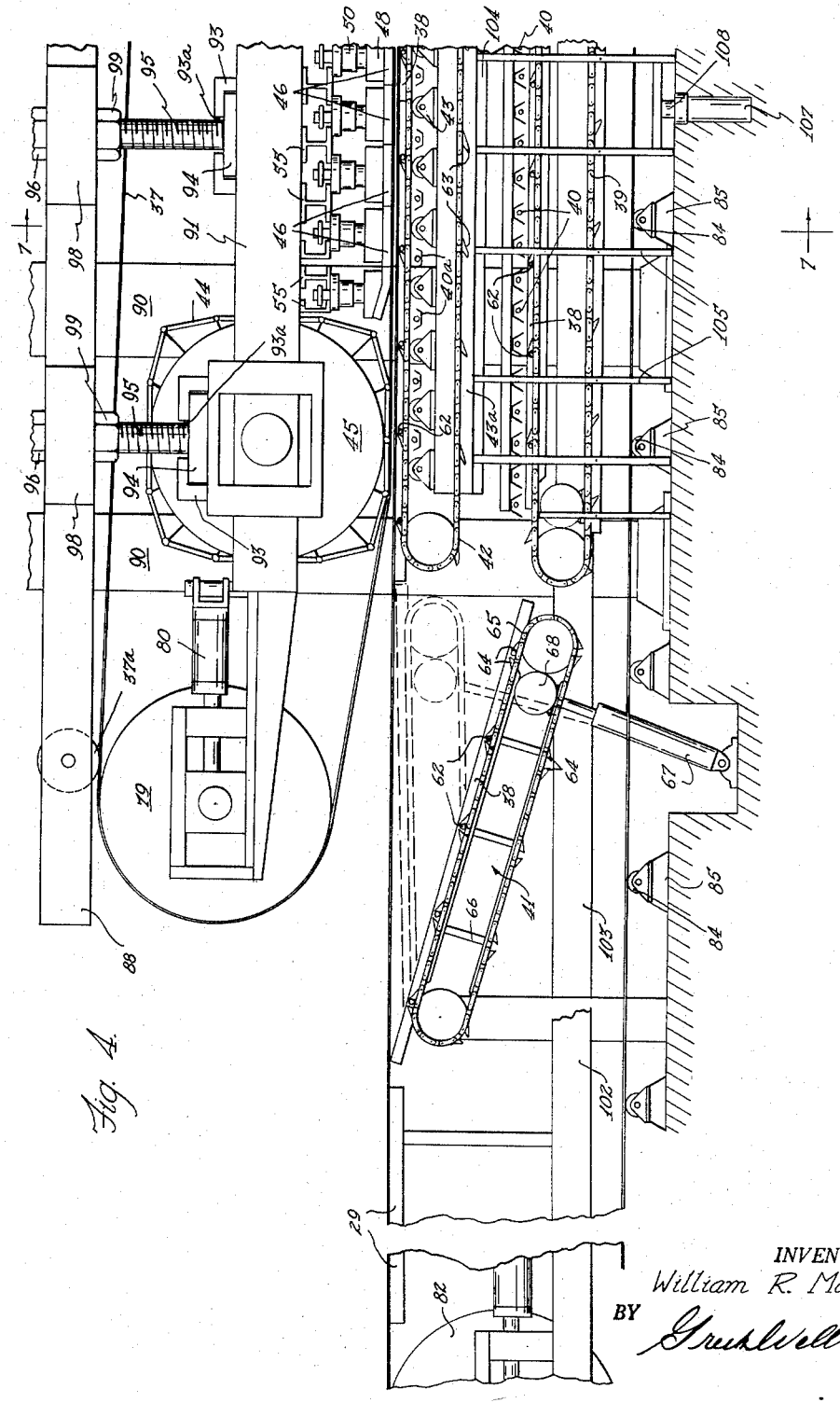

W. R. MATTHEWS 2,926,719

PROCESS AND APPARATUS FOR MOLDING BOARD
IN A CONTINUOUS STRIP

Filed June 25, 1953

INVENTOR.
William R. Matthews
BY
Atty.

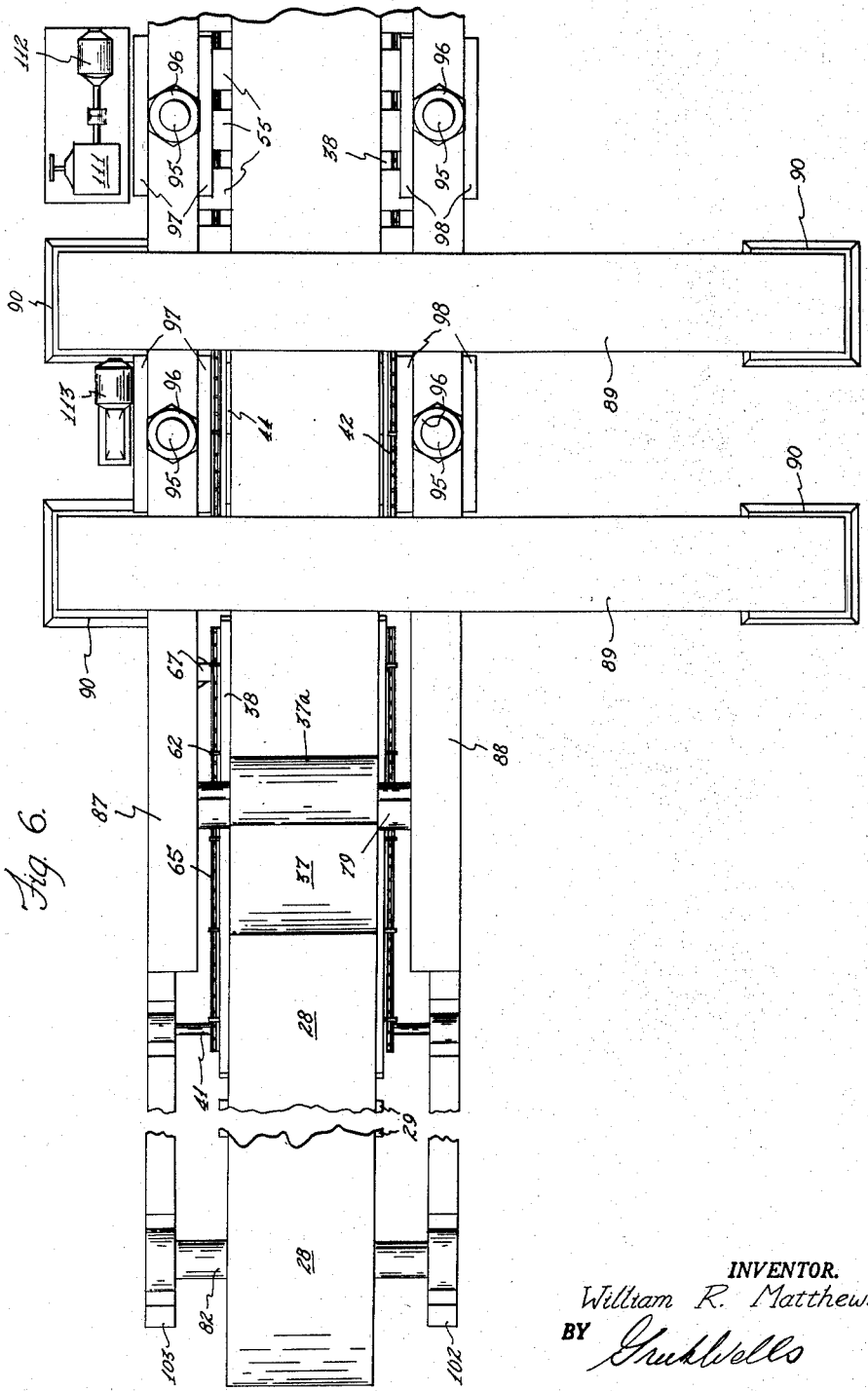

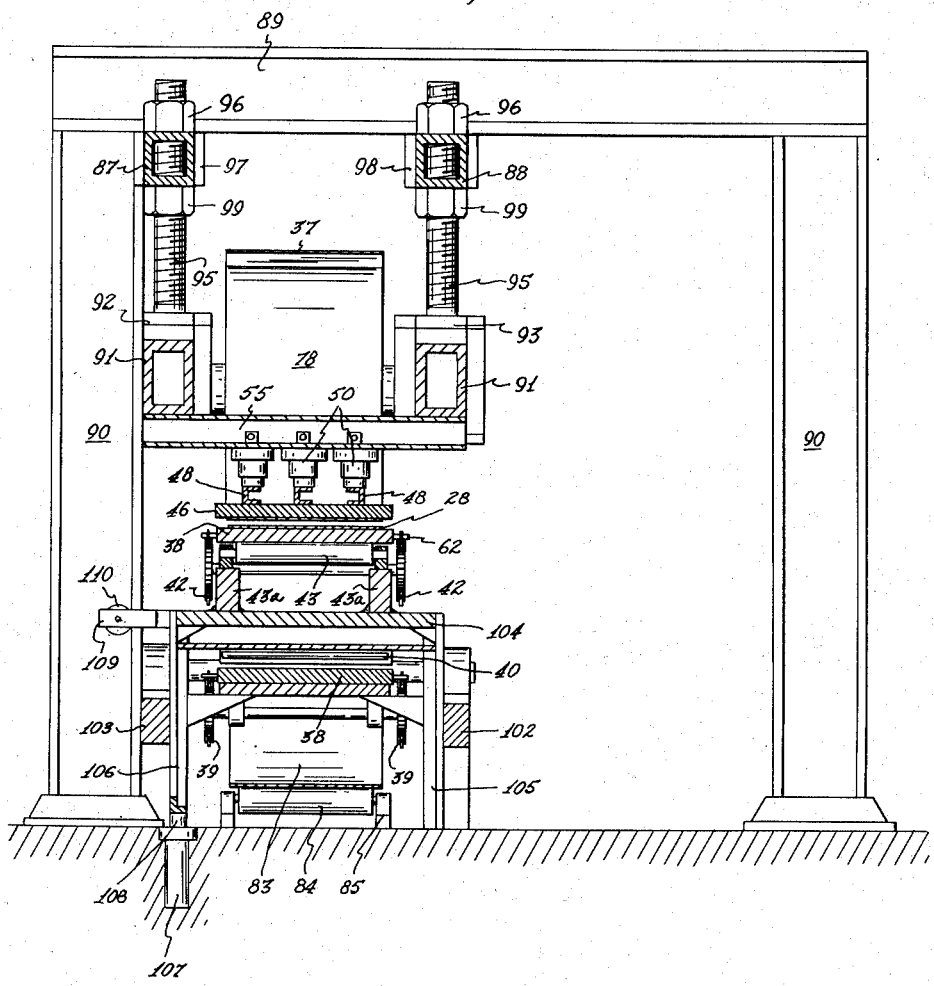

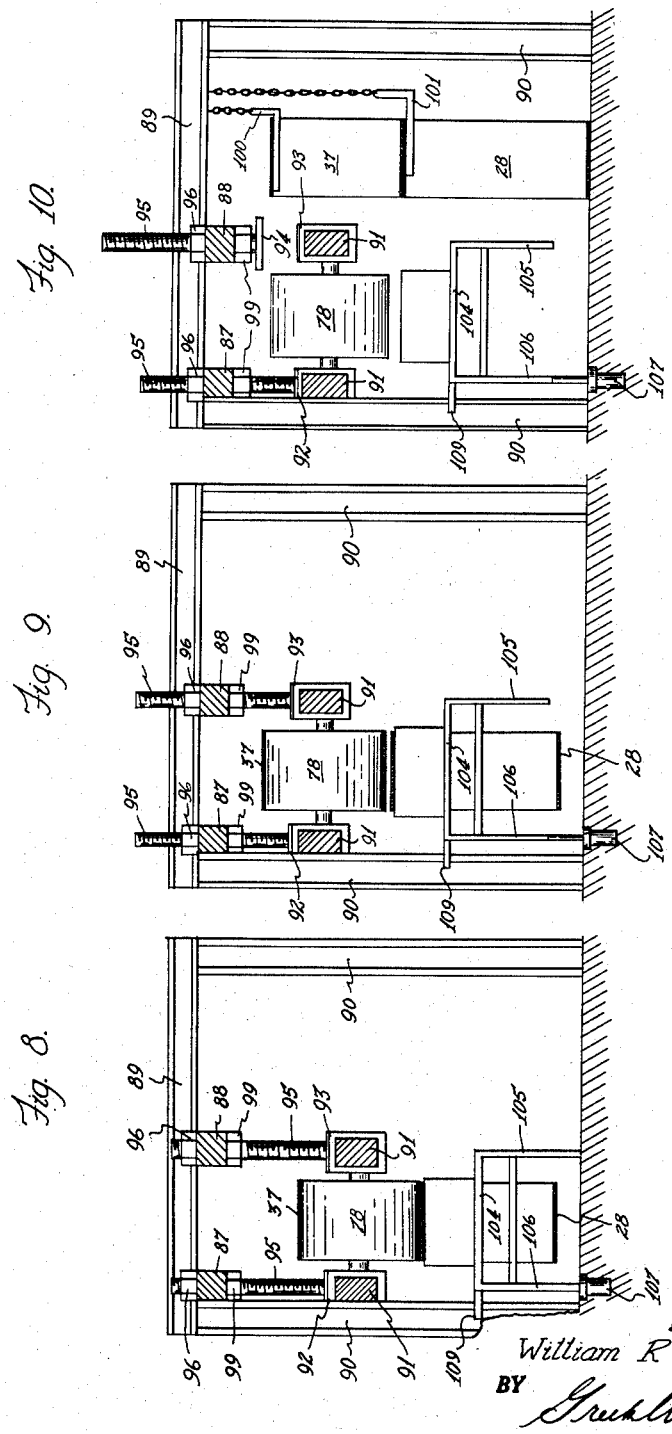

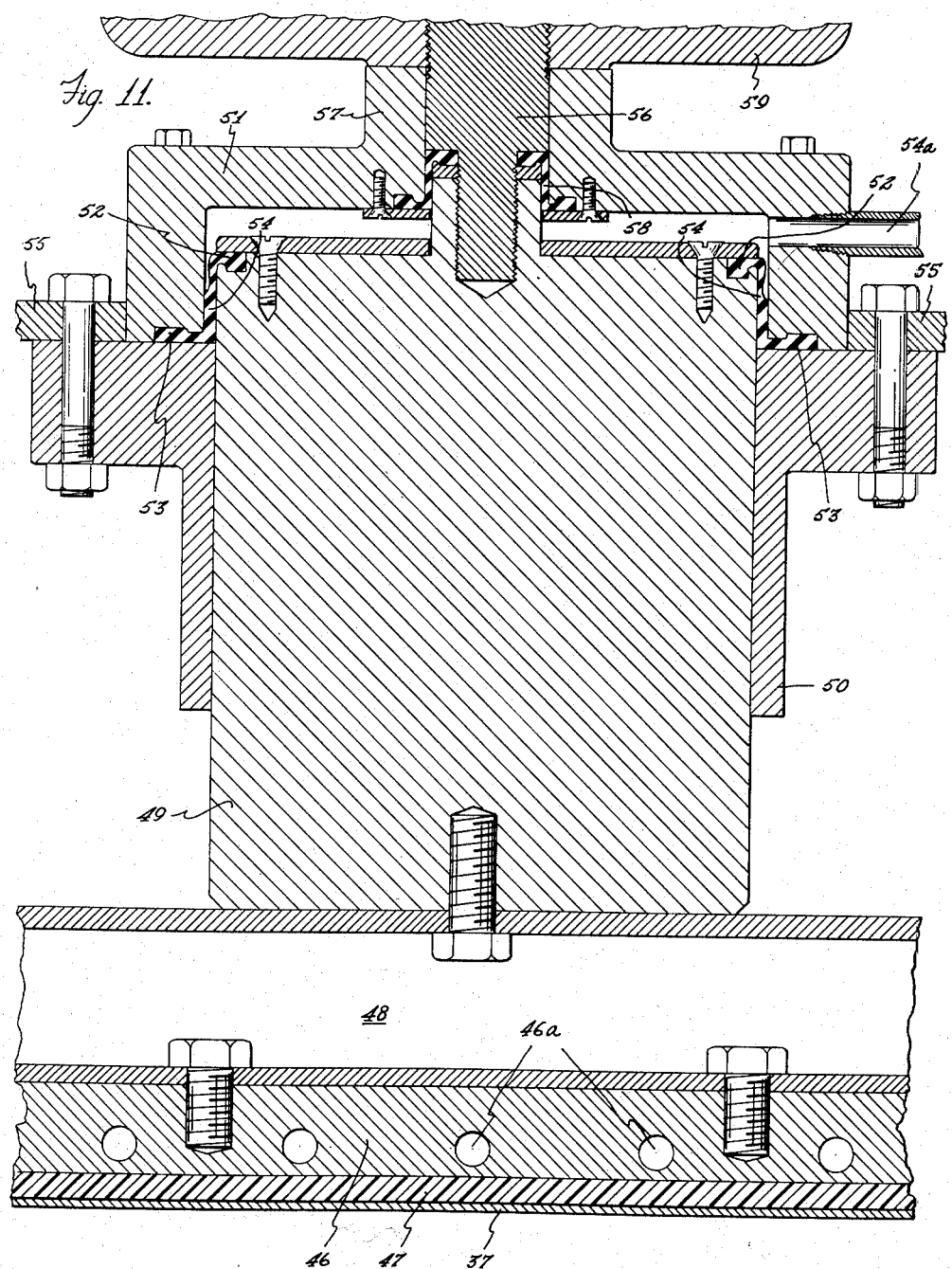

March 1, 1960 W. R. MATTHEWS 2,926,719
PROCESS AND APPARATUS FOR MOLDING BOARD
IN A CONTINUOUS STRIP
Filed June 25, 1953 10 Sheets-Sheet 9

INVENTOR.
William R. Matthews
BY
Atty.

March 1, 1960 W. R. MATTHEWS 2,926,719
PROCESS AND APPARATUS FOR MOLDING BOARD
IN A CONTINUOUS STRIP
Filed June 25, 1953 10 Sheets-Sheet 10

INVENTOR.
William R. Matthews
BY
Atty

United States Patent Office 2,926,719
Patented Mar. 1, 1960

2,926,719

PROCESS AND APPARATUS FOR MOLDING BOARD IN A CONTINUOUS STRIP

William R. Matthews, Spokane, Wash.

Application June 25, 1953, Serial No. 364,078

14 Claims. (Cl. 154—1)

My invention relates to a process and apparatus for molding board in a continuous strip.

The principal purpose of my invention is to provide a process and apparatus by which such materials as wood shavings, chips, splinters, vegetable fibers, etc. can be united economically to make board of substantial strength and true dimensions utilizing the fibers in the wood and vegetable particles substantially in their natural state. To attain this purpose the fibrous particles are heated and the proper moisture content is retained by coating the particles with a waterproofing agent. The temperature of the coated particles is maintained at a level such that the particles when mixed with a thermo-setting resin binder will supply heat to keep the mixture of particles and binder at a temperature within the molten range and close to the curing temperature of the thermo-setting binder. The waterproofed particles are coated, while hot, with the resin binder and then advanced, as a continuous mass, between polished opposed traveling belts. The belts are held at the high temperature too. The mass is quickly compressed and held, while traveling, under compression at a uniform pressure long enough for most of the curing reaction of the binder to take place. Since the entire mass at the time of compression is already close to the curing temperature of the binder, the heat of compression and the heat due to the curing reaction, which is exothermic, add plenty of heat to maintain the curing reaction throughout the thickness of material. Reaction of the resin is uniformly rapid. The heat loss by radiation is offset by applying heat to the exterior surfaces of the belts. The curing reaction under compression is accomplished in a few seconds, for example, two seconds to three seconds. It is not necessary to wait for heat to penetrate through the fibrous particles.

After the compression step the belts carry the compressed, partially cured strip forward. The strip is released momentarily from pressure between this stage and the final curing stages. Then the belts carry the strip through the final curing and ironing, traveling beneath a plurality of presser heads, each independently held. This works the top surface to give the strip a smooth calendered face. The presser heads are graduated in temperature to cool the strip toward the end of its travel between the belts so that the strip is stabilized by the time it passes out from beneath the last presser head and is discharged.

The mechanism by which the process is carried out is in part conventional. However, it is characterized by certain novel relations that make possible the efficient execution of the several steps in the process. In the cutting of the particles from the green wood, the desired lengths and thicknesses of particles are obtained by utilizing a chain type cutter filled with the individual teeth that score the wood across the grain then slice out the part between score lines. Initial surface drying and subsequent layer heating of the particles is accomplished by radiant heating from infra-red sources.

The initial and major compression is accomplished by the utiliaztion of a multilink platen around a single wheel driven by the wheel to move at the desired rate of travel. Means are provided within the platen to keep the pressing links of the platen straight and parallel to the opposed belt for the required time for reaction of the resin binder. This platen releases the pressure briefly, then the belts carry the strip beneath several unique separate presser heads which apply only enough pressure effectively to hold the dimension of the strip and to smooth the top surface as the curing is completed and the strip is cooled.

The belt that supports the strip is backed up throughout its travel by separate heated platens which travel with the belt over rollers, these platens being pushed along with the belt but being free of any positive connection with the belt. The platens supporting the lower belt are dropped and returned individually after the strip has passed beneath the last of the presser heads. Means are provided for heating the belt engaging faces of these platens before they again engage the lower belt in advance of the compression area.

In machines of this character using endless metal bands of considerable length and width, the necessity to remove and replace the belts is evident. My invention contemplates arranging the apparatus in such fashion that the top band or the bottom band can be lifted out and replaced, without dismantling the machine, and, with a minimum of time and effort.

The nature and advantages of my invention will appear more fully from the accompanying drawings and the following detailed description illustrating a preferred embodiment of the invention. The drawings and description are intended to be illustrative only and are not intended to limit the invention beyond the scope of the attached claims.

In the drawings:

Figure 1 is a diagrammatic view of a plant for making board from wood particles according to my invention;

Figure 2 is a plan view of a protion of the plant;

Figure 3 is a longitudinal sectional view of the mechanism for resin coating and felting of the wood particles;

Figures 4 and 5 are side views which taken together illustrate the machine for compressing the felted stream of coated wood particles and curing the binder;

Figure 6 is a plan view of the portion of the machine shown in Figure 4;

Figure 7 is a sectional view taken on the line 7—7 of Figure 4;

Figures 8, 9 and 10 are diagrammatic views on a reduced scale at the line 7—7, illustrating the belt replacement feature of the apparatus;

Figure 11 is an enlarged fragmentary sectional view taken on the line 11—11 of Figure 5;

Figure 12:
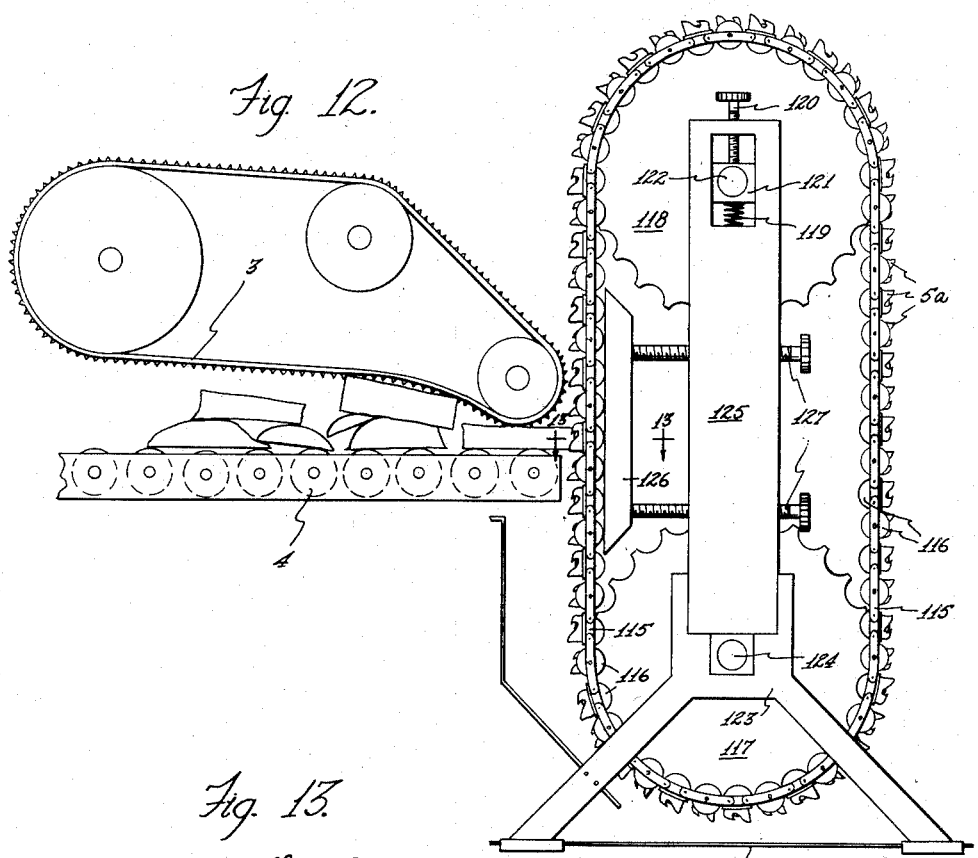
Figure 12 is a view in side elevation of the cutting mechanism for forming the particles of wood.

Referring now to Figures 1 and 2 of the drawings, these figures illustrate a typical plant layout for carrying out my invention. The green wood in various sizes shown at 1, is fed to a cut off saw 2 and then advanced by a conveyor 4 beneath a feed roll 3 to a chain cutting unit 5. This unit has a multiplicity of cutters 5a that cut across the wood 1 and split off thin wafers or splinters. Preferably the cutting is done in such fashion as to leave the fibers intact in the wafers. Cutting across the grain makes short fibers while slicing parallel to the grain leaves the fibers intact for most of the length of the wafer. More detailed description of the cutters 5a will be given later herein.

The particles are dropped from the unit 5 onto a travelling screen 6 which passes the fines, sawdust, etc. on to a collector conveyor 7. The screened particles go into a drying oven 8 where they are exposed in infra-red heaters 8a to dry the surfaces and preheat them for reception of the waterproofing agent. It is necessary to screen out oversize particles such as knots, etc. This is done by the screening mechanism shown at 9, 10, 11 and 12. The member 9 is a shaker screen of conventional construction driven by the eccentric and link drive 11. The particles to be used pass down to a conveyor 10 and the oversize particles are carried away on a conveyor 12.

The conveyor 10 carries the heated particles under low pressure spray units 13 and 14 and an agitator 15 to coat the particles with a suitable waterproofing agent that will act to keep the particles from becoming excessively dry on the surfaces during the following steps of applying a thermo-setting resin binder to the particles and the felting, compressing and curing steps of the process. Any suitable waterproofing agent may be used that will be compatible with the binder used. For example, a high melting point wax or other hydrocarbon can be used to retard the surface dehydration of the particles. An aromatic asphalt is another example of a waterproofing agent, for example, that sold under the trade name Vanadiset.

In the treatment thus far set forth the particles are carried in thin substantially single layer condition on the conveyors. They are next led through an oven 17 by a conveyor belt 16 where they are held under sufficient heat to assure even temperature throughout. The conveyor 16 discharges the hot coated particles into a hopper 18 which in turn feeds the particles downwardly into a felting and coating unit 19 that is adapted to apply the binder to the several particles and to then lay the particles down in layers to provide a mat of coated particles. The unit 19 is shown somewhat diagrammatically in Figure 3. An upper row 20 of heated rollers is arranged beneath two or more outlets 21 from the hopper 18. Vibrators 22 in the outlets shake the particles down so that they pass in streams between the downwardly moving faces of the pairs of rollers 20a and 20b, 20d and 20e etc. The roller 20a has its upwardly moving face held in contact with a companion roller 20c or other means to form a trough 23 to receive a thermo-setting resin in powdered form. In a similar fashion the roller 20d is held against the upwardly moving face of the roller 20b. Other rollers 20f and 20h are held in contact with the rollers 20e and 20g to form troughs 23 for powdered resin. Resin hoppers are indicated at 24. The resin feed is controlled by valves 24a and a control bar 24b.

The rollers 20a to 20h are heated to the molten temperature of the resin which is also the temperature of the wood particles at this point. The particles coated on one side are carried down to another row 25 of heated rollers arranged like the row 20. Dividers 26 direct the particles over the downwardly moving faces of the rollers in the row 25. These rollers receive resin from hoppers 27. Inlets 27a supply resin to the hoppers 27. Valves 27b control the feed of resin from the hoppers 27. The rollers 25a to 25f act to coat the other side of each layer of particles. The coated particles are laid down in successive layers upon a heated polished caul belt 28 which is travelling over a hot platen 29 at this point. The belt 28 is waxed by a roller 30 and then receives from the hopper 31 and the sprayer 32 a surface layer of a mixture comprising varnish made up of the same basic resin as that applied to the particle and a thin layer of the fine particles collected at 7 before the layers of particles are supplied. The several coated layers coming from the row 25 of the coating rollers are laid on the belt 28 to form a mat of the desired thickness. Suitable doctor blades 33 are provided for the rollers in the unit 19. Infra-red or other heat units 34 are utilized to overcome the radiation losses from the several layers of the coated fibers as they are laid down so that the correct temperature of the mat is maintained. The hopper 35 and the sprayer 36 then apply a top surface layer of fines and varnish over the mat.

It will be appreciated that since the mat is formed with the particles of wood and their coating of binder very close to the reaction temperature of the thermo-setting binder, the mat must be compressed immediately upon being formed. By utilizing any suitable thermo-setting resin, such as a phenol formaldehyde resin or urea formaldehyde resin, the resin can be caused to melt as it is spread on the heated particles in the coater 19 and it is carried in the molten state to a pressing stage and put under pressure before the curing reaction proceeds too far. The mechanism by which this is accomplished is illustrated in Figure 4.

As illustrated in Figure 4, the mat leaving the unit 19 on the belt 28 is advanced beneath an upper polished steel belt 37. This belt may be waxed by a roller 37a. For the top and bottom fines layers a phenolic resin-zinc stearate varnish may be applied hot. It helps to avoid sticking of the product to the belts 28 and 37. It also provides a filler of fine particles for the surface of the final board which for certain purposes is desirable. In the event that the fines are not wanted on the surfaces of the board, the hoppers 31 and 35 and the sprayers 32 and 36 are not used. The lower belt 28 is supported on heated individual platens 38 which are brought forward on a conveyor 39 beneath heaters 40 and lifted by a lifting device 41 and then pushed by pusher chains 42 rearwardly beneath the belt 28. The platens 38 travel on a multiplicity of rollers 43 journalled in a supporting bed 43a between the upper and lower reaches of the belt 28. The platens 38 are rigid so that when supported on the rollers 43, they keep the belt 28 straight while the mat is compressed and cured thereon. Heaters 40a between the rollers 43 are provided to supply heat to the platens 38 to make up for radiation losses.

Compression is accomplished by passing the belt 37 under a multiple link platen 44 that is trained about a wheel 45 and driven thereby. The construction of the wheel 45 and platen 44 and the interconnecting means is such that two of the links of the platen travel horizontally and in parallelism with the lower belt 28 on the platens 38, for the required distance to effect compression of the mat to the desired density and sufficient cure of the thermo-setting binder. An example of a mechanism that gives such travel of the platen 44 is shown in the U.S. patent to Royal N. Riblet, No. 2,418,481, dated April 8, 1947, for a wheel.

The wheel 45 is power driven and moves the links of the platen 44 at the proper linear speed to move the belt 37 in unison with the belt 28. It is a characteristic of this construction that the links of the platen 44 move from the angular position into the pressure position smoothly and the links are held in this pressure position for a substantial travel. The wheel 45 and the platen 44 are heated to the proper temperature to avoid cooling of the mat of wood particles. A compression of up to at least 1,000 lbs. p.s.i. can thus be applied and maintained on the mat for the period of time it takes to move the platen links of the platen 44 horizontally under the wheel 45. This time can be adjusted by the speed of the wheel 45 and of the platen 44 to effect the desired amount of cure of the binder in the mat. A time of the order of two to three seconds is ample to cause about a 60% cure of the resin. This is sufficient to permit release of the high pressure. The completion of the cure is accomplished without the need for such high pressure and is done as an ironing operation to give a smooth finish to the top surface of the compressed strip.

The mechanism for carrying the compressed strips through final curing and stabilization is shown best in Figures 4, 5 and 11. A plurality of separate individually mounted and heated presser heads 46 are placed side by side and extend across the belt 37. These heads have facings 47 of a material having an extremely low coefficient of friction. The material is the plastic composition sold under the trade name Teflon, impregnated with graphite. The facings 47 ride directly on the belt 37. Each head 46 is fixed to a beam 48 that in turn is bolted to a piston 49. The piston 49 is guided in a shell 50 that forms part of a cylinder for the piston 49. The cylinder is completed by a cup 51 bolted to the shell 50. Non-leak seals 52 and 53 connect a resilient diaphragm 54 to the piston 49 and to the cup 51 and shell 50. Fluid under pressure is supplied through an inlet 54a to maintain the desired pressure on the head 46.

A particular feature of value in this assembly is the mechanism to limit the downward movement of pressure heads 46. The shells 50 are suspended from beams 55 on the machine frame. A stem 56 is provided on the piston 49 and projects through a boss 57 formed on the cup 51. This stem is sealed to the cup 51 by a diaphragm 58 in the same manner that the diaphragm 54 seals the piston to the cup 51 and shell 50. The stem 56 is threaded to receive an adjuster handle 59 that bears on the cup. The piston 49 can move up and down but cannot go below the limit set by the handle 59. This construction provides quick adjustment to accommodate the machine to different thickness of board. Its most important function however, is to provide safety in the event that by accident, or otherwise, some hard object is fed between the belts 28 and 37. The pistons can rise against the fluid pressure provided, forcing the fluid out through the inlet 54, without breaking anything and without wedging the presser head. Any desired number of pistons may be provided for each presser head 46. As shown, there are three pistons for each presser head.

The platens 38 are provided with pins 62 at their side edges to engage lugs 63 on the pusher chains 42 and lugs 64 on the chains 65 of the lifter 41. The lifter 41 has a supporting frame 66 to support the platens between the chains 65. The lifter 41 is raised and lowered at the proper time by an hydraulic jack 67. The chains 65 are driven by a reversible motor 68 that is carried on the frame 66. To move the platens 38 on to the lifter 41, the chains 65 are driven in a counter clockwise direction, as viewed in Figure 4. Then the jack 67 raises the lifter 41 to the dotted line position shown in Figure 4. After the lifter 41 is raised, the motor 68 is reversed to move the platen 68 into position to be advanced by the pusher chains 42. It will be noted that the lugs 64 are provided in pairs so that the chains 65 can move the platens 38 in both directions.

The platens 38 are carried on the rollers 43 until they pass from beneath the last of the presser heads 46. In order to control the temperature in the latter stages of the ironing of the strip, jets 69 are provided beneath the platens 38 and the presser heads 46 each have fluid passages 46a for supplying them with fluid at the desired temperature. When the platens 38 pass from beneath the last of the presser heads 46, they are carried by the pusher chains 42 on to a lowering device 70. This lowering device 70 has a belt 71 on which the platens are supported. It is lifted to the dotted line position shown in Figure 5 by an hydraulic jack 72. The belt 71 is supported on a frame 73 that also carries a motor 74 for driving the belt 71.

The belt 71 delivers the platens 38 to the conveyor 39. The conveyor 39 carries the platens 38 beneath a platen cleaner 75 that has the brushes 76 for cleaning the top surfaces of the platens 38. The conveyor 39 carries the platens 38 beneath a plurality of heaters 77 that bring the platens 38 up to the temperature at which they should engage the belt 28 when they are lifted into place by the lifter 41.

The top belt 37, after it passes under the last presser head 46, travels around a pulley 78 and then over the presser heads 46 and the multiple link platen 44 and around a front pulley 79. The front pulley 79 is mounted for adjustment toward and away from the pulley 78. Hydraulic jacks 80 urge the pulley 79 away from the pulley 78 to maintain proper tension of the belt 37. The belt 28 is trained around pulleys 82 and 83 (Figures 1, 4 and 5), these pulleys being mounted in the same manner as pulleys 78 and 79. Between the pulleys 82 and 83, the lower flight of the belt 28 is supported by spaced rollers 84 that are mounted on supports 85. The upper flight of the belt 28 is supported near the pulley 83 by the platen 29. The platens 38 support the belt 28 while it is beneath the linked platen 44 and the presser heads 46. The platen 29 may be heated in the same manner as the presser heads 46.

One of the novel features of the present invention is the construction of the supporting mechanism for the belts 28 and 37 and the associated pressure applying and heating devices which permits ready replacement of the belts. These belts have to be maintained in excellent condition and if they become damaged or broken, they must be replaced. The several parts of the machine that cooperate to support the belts are arranged so that the belts can be moved laterally out of, and into place in the machine. Figures 8, 9 and 10 illustrate diagrammatically how the belts are replaced. The pulleys 78 and 79, the link platen 44, the wheel 45 and the several presser heads 46 are suspended from two overhead frame members 87 and 88. The frame members 87 and 88 are in turn carried by cross beams 89 which are mounted on columns 90. The columns are spaced apart a distance at least twice the width of the machine and the machine is set close to one row of the columns to have a clear space along one side of the machine between it and the other row of columns 90.

The means for suspending the parts from the overhead frame members 87 and 88 comprises a longitudinally extending framework 91 that is vertically slidable along the front faces of the rear columns 90. Brackets 92 are provided on the framework 91 beneath the front overhead frame member 87. Similar brackets 93 are provided on the framework 91 beneath the rear overhead frame member 88. The brackets 92 and 93 removably mount the heads 94 of large suspension bolts 95. As shown the heads 94 of the bolts 95 are rectangular and the brackets 92 and 93 are provided with channels 92a and 93a that will pass the heads 94 when the long sides of the heads 94 are aligned with the channels, but will not pass the heads 94 when the long sides of the heads are crosswise of the channels. Bearing blocks 97 and 98, on the overhead frame members 87 and 88 respectively, receive the bolts 95. Each bolt 95 is threaded to receive two nuts 96 and 99. The bolts 95 and nuts 96 and 99 are used to move the framework 91 up and down. The nuts 96 above the blocks 97 and 98, limit downward movement of the framework 91 and the nuts 99 limit upward movement of the framework 91.

As illustrated in Figures 8, 9 and 10, the steps necessary to replace the upper belt 37 are as follows: First the nuts 96 and 99 are run down on the bolts 95 that are suspended from the overhead frame members 87 and 88 until the desired clearance is obtained between the belt 37 and the belt 28. The nuts 96 and 99 on the bolts 95 suspended from the front overhead frame member 87 are then loosened so that the heads 94 of the bolts 95 can be turned to move up through the channels 93a in the brackets 93. The rear bolts 95 carry the load of the parts suspended at this time with the rear face of the framework 91 bearing against the column 90 to prevent bending of the bolts. The front bolts 95 are then run up out of the way (see Figure 10) and the belt 37 can be moved edgewise toward the front. The hydraulic jacks 80 are released to loosen the belt 37. Next the belt 37 is moved laterally on to supporting members 100 and 101 that are suspended from the cross beams 89. A new belt can then be substituted for the old belt 37. When the new belt 37 is in place, the jacks 80 are used to tension it and the front bolts 95 are again seated in the brackets 93. Then the framework 91 can be returned to its original position.

The means that make possible replacement of the lower belt 28 are relatively simple. The pulleys 82 and 83, the bed plate 43a, the lifter 41, the conveyor 39 and the several other parts between the upper and lower flights of the belt 28 are supported by side frame members 102 and 103 which are connected transversely of the machine by frame members 104. Standards 105 and 106 at opposite sides of the belt 28 rest on the foundation and support the members 102 and 103. The members 104 connect the tops of the standards 105 and 106. This framework must be lifted to clear the front standards 105 from the foundation whenever the belt 28 has to be replaced. The mechanism for lifting the framework comprises a plurality of hydraulic jacks 107 spaced lengthwise of the machine and set into the foundation. These jacks have their pistons 108 fixed to the adjacent rear standards 106. Certain standards 106 have brace members 109 extending laterally to the columns 90. These members 109 have have rollers 110 riding on the back sides of the front flanges of the columns 90. When the jacks 107 lift the framework, the brace members 109 are put in tension to prevent the framework from tipping forward. The lifter jacks 67 and 72 are so connected to the lifter 41 and the lowering device 70 that no part of these jacks lie in front of the belt 28.

It is believed to be evident from the foregoing description that I have provided a simple effective means to change the belts 28 and 37 without dismantling the machine. The fluid connections from units such as the pump 111 are flexible hose that permit the necessary movement of the frameworks for replacing the belts. A motor 112 drives the pump 111. A motor 113 drives the wheel 45.

Referring now to the cutting unit 5, the details of this unit are shown best in Figures 12 to 16 of the drawings. It is designed to cut segments from wood blocks in such a way as to provide the wafers or splinters of the desired length with as little waste as possible. Several endless chains 115 carry the cutters 5a and rollers 116. The rollers 116 act to guide the chains 115 and to drivingly connect the chains to a drive drum 117. The chains 115 are trained over an upper drum 118 which is mounted for adjustment toward and away from the drum 117 by springs 119 and screws 120 engaging bearing blocks 121 for the drum shaft 122. The drums 117 and 118 are supported by a framework comprising a base 123 which mounts the shaft 124 of the drum 117 and uprights 125 which mount the parts 119—122. The uprights 125 carry a backing plate 126 on screws 127. The backing plate 126 engages the rollers 116 while the cutters 5a are traversing a block of wood.

Figure 13:
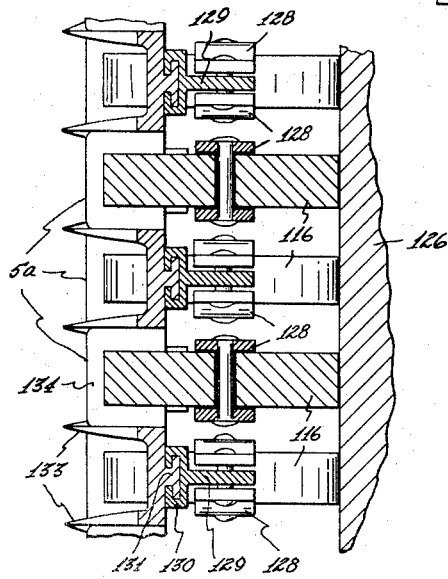
Figure 13 is a sectional view taken on the line 13—13 of Figure 12.
Figure 14:
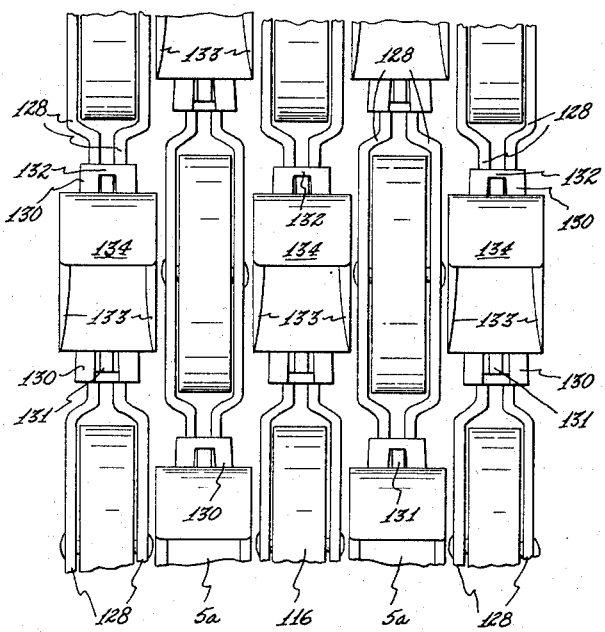
Figures 14, 15 and 16 are detailed views of the cutting teeth used in the cutting mechanism.
Figure 15:
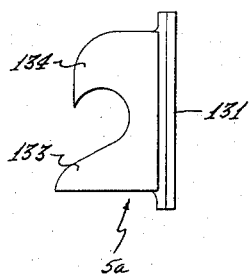
Figure 16:
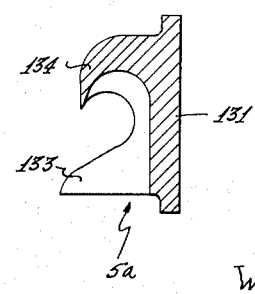

As illustrated best by Figures 13 to 15, the chains 115 are made up of roller carrying links 128 alternated with links 129 carrying the cutters 5a. The cutters 5a are detachably mounted to the links 129 by providing channels 130 in the links 129 and providing flanged ribs 131 on the backs of the cutters 5a. The channels 130 and the flanges of the ribs 131 are tapered as indicated in Figure 14 so as to wedge the flanges in the channels. The channels 130 are closed at the small ends as indicated at 132.

The cutters 5a are provided with spaced scoring teeth 133 at their forward ends. To the rear of the scoring teeth the cutters 5a have forwardly curved slicers 134 that are sharp edged to slice off wafers from the wood block. The scoring teeth 133 project farther from the ribs 131 than the slicers so that the wood is always scored deeper than it is sliced. This avoids splitting the wood too deeply by the slicers. Looking transversely of the chain, it will be noted that the depth of slice is primarily determined by the amount that the slicers project outwardly beyond the rollers. The scoring teeth 133 are spaced apart so that the adjacent teeth on two chains side by side follow the same path across a block of wood. The wood as cut from the blocks is carried down by the teeth and dropped onto the conveyor 7.

The complete operation of the making of boards from the chips and splinters has been explained in detail hereinbefore. The various steps start with the formation of the desired sizes of wafers and splinters by the cutting device 5. These particles are then screened to size and dried. The particles are then coated with a surface coating which will prevent undue surface drying and excessive absorption of the binder. Certain coatings for the purpose of water proofing and protecting the particles have already been mentioned, however, any suitable water proofing agent may be used such as zinc stearate or another mineral salt of similar nature. The essential drying of the particles will raise their temperature but after coating them with the water proofing agent the particles are further heated so that they are brought to a point close to the final temperature before they are felted together and before they are coated with the resin coating used as a binder. The reason for this is to avoid the inherent difficulties in obtaining uniform temperature through a felted mass of the fibers and binder. If the particles are initially heated to a uniform temperature before being felted, the temperature gradient from the middle of the layer to the surfaces will be less and it will be much easier to supply heat to the surfaces to overcome radiation losses.

As illustrated in the drawings, the particles are coated while hot with a thermo setting binder which is brought to the molten state and the several thin streams of coated particles are then laid one upon another, to produce a layer of the desired thickness for pressing. Once this is accomplished, the layer is ready for pressing and passes immediately underneath the platen 44, being carried by the belt 28 and covered by the belt 37. Compression and curing to a point where the compressed layer has sufficient rigidity to retain its form temporarily is accomplished in the short travel of the layer beneath the platen 44. It has been found that a period of from two to three seconds under the compression of the platen 44 is ample to obtain a sufficient curing of the phenol formaldehyde resin.

One of the distinctive advantages of this method of treating the particles lies in the fact that there is no excessive moisture to be evaporated out of the felted mass of particles and binder. Another distinct advantage of this method is that addition of heat after the coating of the particles with the binder is practically limited to the heat necessary to overcome radiation losses. The heat created by the compression and by the exothermic reaction of the thermo setting resin is ample to effect the cure to the desired degree. It should be understood of course, that the platen 44 and the platens 38 are sufficiently heated to supply the necessary heat through the belts 28 and 37 to overcome radiation losses. Advantage is taken of the fact that the resin can be brought to a molten state at a temperature slightly below the curing temperature and held there long enough to complete the coating operation without premature reaction before compression.

Any thermosetting binder is suitable so long as it is of a nature that it may be brought to a molten state and retained in that state long enough to permit coating of the particles and compression before the setting reaction has been carried far enough to cause loss of strength by the compression. It is preferred to use a powdered two-stage thermosetting phenol formaldehyde resin. Such a resin binder can be mostly cured at temperatures in the range of 300–380 degrees F. in a period of a few seconds, provided, the temperature is uniform and it is not necessary to drive out a quantity of moisture. The resin binder in finely powdered form is fed on to the coating rollers 20 and 25 which heat the powdered resin and melt it. The temperature of the rollers is preferably at the lower temperature within the range where the resin is molten. A temperature of 280–340 degrees F. has been found satisfactory with the resin referred to hereinbefore. The heat added by the heaters 34 to the coated particles replaces any radiation losses. The particles are heated to about the mean setting temperature desired before they are coated; that is, to about 320–350 degrees F. They need not take up any of the heat reaction of the resin. They are hot enough to keep the resin in a molten state when it is spread upon them. Since the surfaces of the particles are already treated with the water proofing agent, they are really not "impregnated." Coating more correctly describes the relation of the resin to the particles. The waterproofing agent used is selected to be compatible with the resin used so that the resin particle bond will not be interferred with.

The coating structure described herein is designed to receive the thermosetting resin binder in powder form. It is obvious however, that when a resin binder is used that is liquid in form (for example, that described in the patent to Miller, No. 2,397,194, dated March 26, 1946), the coating mechanism shown can also be used.

When the compression stage is over the layer of fibers and partially cured binder has sufficient stability that the pressure may be temporarily released in the short interval while the layer travels from the platen 44 to the first pressure heads 46. The amount of pressure on the presser heads 46 is relatively slight when compared with the pressure placed on the layer while it passes beneath the platen 44. This means that the friction due to sliding the belt 37 across the faces of the presser heads 46 is slight and the resultant wear on the belt 37 and the presser heads is not a serious factor. The layer is kept under pressure between the presser heads 46 and the platens 38 long enough to complete the curing of the binder and to iron the top surface of the layer smooth. The cooling of the layer can be carried to any desired degree while the board is maintained under pressure between the two belts. However, the heat extracted from the platens 38 must, of course, be restored before these platens are returned to engagement with the belt 28. After the layer leaves the presser heads the edges may be trimmed and the finished product may be cut into suitable lengths as desired. Equipment for this purpose is well known and has not been shown herein.

The drawings have not shown the power elements for operating the wheel 45 and driving the belt 28 and the various conveyors. This equipment is of conventional design and is not a part of the present invention. Therefore it is not believed to be necessary to illustrate it. A housing around the coating and compressing mechanisms to avoid heat losses may, of course, be provided in accordance with good engineering practice.

It is believed that the nature and advantage of my invention will be clear from the foregoing description.

Having thus described my invention, I claim:

1. In an apparatus for the continuous production of board from particles of vegetable fiber and a thermo-setting resin binder therefor, the combination with a caul belt for receiving thereon a continuous mat of a mixture of the particles and the resin, of a second belt over the first named belt and means to compress the mat and cure the resin between said belts, said means comprising heated platens supporting the lower belt and moving with it, a multiple link endless platen riding on the second belt, a wheel riding on and moving the multiple link platen, means connecting the links of said multiple link platen to said wheel operable to force the links into parallelism with the heated platens supporting the lower belt before they pass beneath the wheel, and operable to hold said links in parallelism as they move beneath the wheel, and said means being operable to prevent any portion of a link from moving substantially below the plane defined by the lower face of a link while it is in parallelism with the lower platens and beneath the wheel, whereby to prevent indenting of the second caul belt and the board formed therebeneath.

2. In an apparatus for the continuous production of board from particles of vegetable fiber and a thermo-setting resin binder therefor, the combination with a caul belt for receiving thereon a continuous mat of a mixture of the particles and the resin, of a second belt over the first named belt and means to compress the mat and cure the resin between said belts, said means comprising heated platens supporting the lower belt and moving with it, a multiple link endless platen riding on the second belt, a wheel riding on and moving the multiple link platen, means connecting the links of said multiple link platen to said wheel operable to force the links into parallelism with the heated platens supporting the lower belt before they pass beneath the wheel, and operable to hold said links in parallelism as they move beneath the wheel, and said means being operable to prevent any portion of a link from moving substantially below the plane defined by the lower face of a link while it is in parallelism with the lower platens and beneath the wheel, whereby to prevent indenting of the second caul belt and the board formed therebeneath, a plurality of vertically movable presser heads adjacent to said multiple link platen and beneath which the belts and compressed mat travel, hydraulic jacks for said presser heads operable to exert downward pressure thereon, and means limiting the downward movement of said presser heads by said jacks.

3. In an apparatus for the continuous production of board from particles of vegetable fiber and a thermo-setting resin binder therefor, the combination with a caul belt for receiving thereon a continuous mat of a mixture of the particles and the resin, of a second belt over the first named belt and means to compress the mat and cure the resin between said belts, said means comprising heated platens supporting the lower belt and moving with it, heated compression members engaging the second belt and pressing it down upon the mat on the lower belt, a framework supporting the second belt and said compression members, overhead frame members, vertically movable suspension members on opposite sides of the belt and suspending the framework from said members, the suspension members at one side of the belt being releasable, while the framework is supported by the suspension members at the other side, to provide clearance for removal of the second belt edgewise from its framework.

4. In an apparatus for the continuous production of board from particles of vegetable fiber and a thermo-setting resin binder therefor, the combination with a caul belt for receiving thereon a continuous mat of a fixture of the particles and the resin, of a second belt over the first named belt and means to compress the mat and cure the resin between said belts, said means comprising heated platens supporting the lower belt and moving with it, heated compression members engaging the second belt and pressing it down upon the mat on the lower belt, a framework supporting the second belt and said compression members, overhead frame members, vertically movable suspension members on opposite sides of the belt and suspending the framework from said members, a lower framework supporting the lower belt and its platens, supports at both sides of said lower belt on which said lower framework is carried, and jacks carrying the supports at one side of said lower belt operable to lift the lower framework and the supports at the other side of said lower belt and provide clearance for removal of the lower belt edgewise from its framework.

5. A continuous process of making hard dense strips from a thermo-setting binder and such materials as wood shavings, chips, splinters, and other vegetable fibers which comprises coating particles of such materials with a waterproofing agent, heating the particles to a temperature about 280–350 degrees F. and slightly below the reaction temperature but within the molten temperature range of the binder, coating the particles while at said temperature with the molten binder, then felting the particles coated with the binder into a web and compressing the web while maintaining it at such temperature to cure the binder and form a board.

6. In an apparatus for the continuous production of board from particles of vegetable fibers and a thermo-setting resin binder therefor, the improvement comprising means to heat the particles to the reaction temperature of said resin binder, a plurality of transversely spaced coating devices, a caul belt beneath said coating devices, means to pass spaced apart streams of heated particles downwardly onto said caul belt in close juxtaposition to said coating devices, said coating devices being operable to coat said streams with resin binder, means to move said caul belt transversely beneath said coating devices whereby to form said transversely spaced streams into a multiple layer mat on said caul belt, and means to compress said mat.

7. A process of making composite board from particles of vegetable fibers comprising the steps of heating said particles to reduce the moisture content of said particles, coating said particles while hot with a water-proofing agent to militate against the escape of any further moisture, applying additional heat to said particles, coating said particles with a coating of molten thermo-setting resin binder when said particles have been heated to substantially the reaction temperature of said resin binder, then felting the coated particles into the desired shape while the coating is in the molten state and indurating the binder.

8. A process of making composite board from particles of vegetable fibers comprising the steps of heating said particles and a thermo-setting resin binder to a temperature at which the resin binder is molten, then coating the particles at said temperature with the molten resin binder and felting the binder coated particles to the desired shape while the coating is molten and finally indurating the binder.

9. A process of making composite board from particles of vegetable fibers comprising the steps of heating said particles and a thermo-setting resin binder to a temperature at which the resin binder is molten, then coating the particles at said temperature with the molten resin binder, then while the coating remains molten, felting the fibers into a thick mat and compressing the mat to a board and holding it compressed until the resin binder is sufficiently reacted by the effect of the heat stored in the coated particles temporarily to hold the particles in place.

10. A process of making composite board from particles of vegetable fibers comprising the steps of heating said particles and a thermo-setting resin binder to a temperature at which the resin binder is molten, then coating the particles at said temperature with the molten resin binder, then while the coating remains molten, felting the fibers into a thick mat and compressing the mat to a board and holding it compressed until the resin binder is sufficiently reacted by the effect of the heat stored in the coated particles temporarily to hold the particles in place, then releasing the pressure on the board and thereafter finish curing the board by subjecting it to light pressure.

11. A process of making composite board from particles of vegetable fibers comprising the steps of heating said particles to reduce the moisture content of said particles, coating said particles with a water-proofing agent to militate against the escape of any further moisture, heating said particles and a thermo-setting resin binder to a temperature at which the resin binder is molten, then coating the particles at said temperature with the molten resin binder and felting the binder coated particles to the desired shape while the coating is molten and finally indurating the binder.

12. A process of making composite board from particles of vegetable fibers comprising the steps of heating said particles to reduce the moisture content of said particles, coating said particles with a water-proofing agent to militate against the escape of any further moisture, heating said particles and a thermo-setting resin binder to a temperature at which the resin binder is molten, then coating the particles at said temperature with the molten resin binder, then while the coating remains molten, felting the fibers into a thick mat and compressing the mat to a board and holding it compressed until the resin binder is sufficiently reacted by the effect of the heat stored in the coated particles temporarily to hold the particles in place.

13. A process of making composite board from particles of vegetable fibers comprising the steps of heating said particles and a thermo-setting resin binder to a temperature at which the resin binder is molten, dividing the so heated particles into a plurality of thin streams and separately coating the several streams with the molten resin binder, then laying the several streams of coated particles one upon the other to form a multiple layer mat and, while the coating is molten, compressing the layers together to a board and holding the board compressed until the resin binder is sufficiently reacted to hold the particles in place.

14. In an apparatus for the continuous production of board from particles of vegetable fiber and a thermo-setting resin binder therefor the combination with a lower caul belt for receiving thereon a continuous mat of a mixture of the particles and the binder, of a second caul belt over the first named belt, a series of lower platens supporting the lower belt but separate therefrom, means to move the said lower platens with the lower belt during a portion of its travel while the mat is thereon, a series of platens separate from the second belt but overlying that portion of the second belt first engaging the mat on said lower belt, means to move the last named platens with the second belt and means to move each platen of one series toward the platens of the other series and maintain it parallel to the platens of the other series for a short distance whereby to compress the mat between said belt.

References Cited in the file of this patent

UNITED STATES PATENTS

| | | |
|---|---|---|
| 1,448,013 | Warren | Mar. 13, 1923 |
| 1,704,823 | Denny | Mar. 12, 1929 |
| 1,956,866 | Keller | May 1, 1934 |
| 2,075,735 | Loomis | Mar. 30, 1937 |
| 2,292,366 | De Wyk | Aug. 11, 1942 |
| 2,375,008 | Lawrence | May 1, 1945 |
| 2,529,263 | Reese | Nov. 7, 1950 |
| 2,575,744 | Burt | Nov. 20, 1951 |
| 2,580,200 | Shrimpton | Dec. 25, 1951 |
| 2,623,239 | Fischbem | Dec. 30, 1952 |
| 2,650,812 | Joy | Sept. 1, 1953 |
| 2,655,458 | Collins | Oct. 13, 1953 |
| 2,658,847 | MacDonald | Nov. 10, 1953 |
| 2,673,370 | Goss | Mar. 30, 1954 |
| 2,717,420 | Roy | Sept. 13, 1955 |